(12) United States Patent
Frederick et al.

(10) Patent No.: US 10,889,452 B1
(45) Date of Patent: Jan. 12, 2021

(54) ARTICLE ACCUMULATION AND ARTICLE GROUP FORMATION

(71) Applicant: Douglas Machine Inc., Alexandria, MN (US)

(72) Inventors: Aaron M. Frederick, Alexandria, MN (US); Richard W. Lukanen, Jr., Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 16/668,658

(22) Filed: Oct. 30, 2019

Related U.S. Application Data

(60) Provisional application No. 62/752,591, filed on Oct. 30, 2018.

(51) Int. Cl.
*B65G 47/26* (2006.01)
*B65G 47/32* (2006.01)
*B65G 47/44* (2006.01)
*B65G 47/08* (2006.01)
*B65G 47/90* (2006.01)
*B65G 47/68* (2006.01)

(52) U.S. Cl.
CPC ......... *B65G 47/261* (2013.01); *B65G 47/082* (2013.01); *B65G 47/084* (2013.01); *B65G 47/32* (2013.01); *B65G 47/44* (2013.01); *B65G 47/902* (2013.01); *B65G 47/682* (2013.01)

(58) Field of Classification Search
CPC .... B65G 47/08; B65G 47/082; B65G 47/084; B65G 47/086; B65G 47/088; B65G 47/901; B65G 47/902; B65G 47/907; B65G 47/30; B65G 47/32; B65G 47/44

USPC .............................. 198/426, 429–430, 347.2
See application file for complete search history.

(56) References Cited

U.S. PATENT DOCUMENTS

| 4,499,987 | A | * | 2/1985 | Long | B65G 47/5181 |
| | | | | | 198/347.3 |
| 4,768,642 | A | * | 9/1988 | Hunter | B65G 47/082 |
| | | | | | 198/419.2 |
| 4,802,570 | A | * | 2/1989 | Hirsch | B65G 47/082 |
| | | | | | 198/430 |

(Continued)

FOREIGN PATENT DOCUMENTS

| WO | 2017041007 A1 | 3/2017 |
| WO | 2017147584 A1 | 8/2017 |

*Primary Examiner* — Mark A Deuble
(74) *Attorney, Agent, or Firm* — Dicke, Billig & Czaja, PLLC

(57) ABSTRACT

An article processing station is characterized by an accumulating article shaft and robotic EOAT receiving articles entering the shaft. The shaft includes a grouped article receiving deck within an egress portion of the shaft, opposingly paired sidewalls, and an end wall downstream of the sidewalls. The deck includes spaced apart deck fingers, the end wall includes spaced apart wall fingers, and the EOAT includes spaced apart tool fingers. The tool fingers are registerable in relation to spaces of the spaced apart wall fingers and the spaced apart deck fingers so as to pass there through. The tool travels to, through and from the shaft, so as to receive articles entering the ingress portion of the shaft while traveling from the ingress portion towards the egress portion in furtherance of depositing an article group upon the deck during travel from the shaft.

29 Claims, 5 Drawing Sheets

(56) References Cited

U.S. PATENT DOCUMENTS

| | | | | |
|---|---|---|---|---|
| 5,590,754 | A * | 1/1997 | Lowery | B65G 47/44 |
| | | | | 198/512 |
| 5,768,856 | A * | 6/1998 | Odenthal | B65B 5/061 |
| | | | | 198/430 |
| 7,325,668 | B2 * | 2/2008 | Borsarelli | B65G 47/82 |
| | | | | 198/430 |
| 8,356,456 | B2 | 1/2013 | Floding et al. | |
| 2002/0110441 | A1 * | 8/2002 | Padovani | B65G 47/902 |
| | | | | 414/416.09 |
| 2003/0057058 | A1 * | 3/2003 | Iwasa | B65G 17/42 |
| | | | | 198/419.3 |
| 2003/0136641 | A1 * | 7/2003 | Iwasa | B65G 47/082 |
| | | | | 198/419.3 |
| 2009/0277133 | A1 * | 11/2009 | Yokota | B65B 35/58 |
| | | | | 53/244 |
| 2017/0101200 | A1 | 4/2017 | Anderson et al. | |
| 2019/0062074 | A1 * | 2/2019 | Johnson | B65B 35/44 |

* cited by examiner

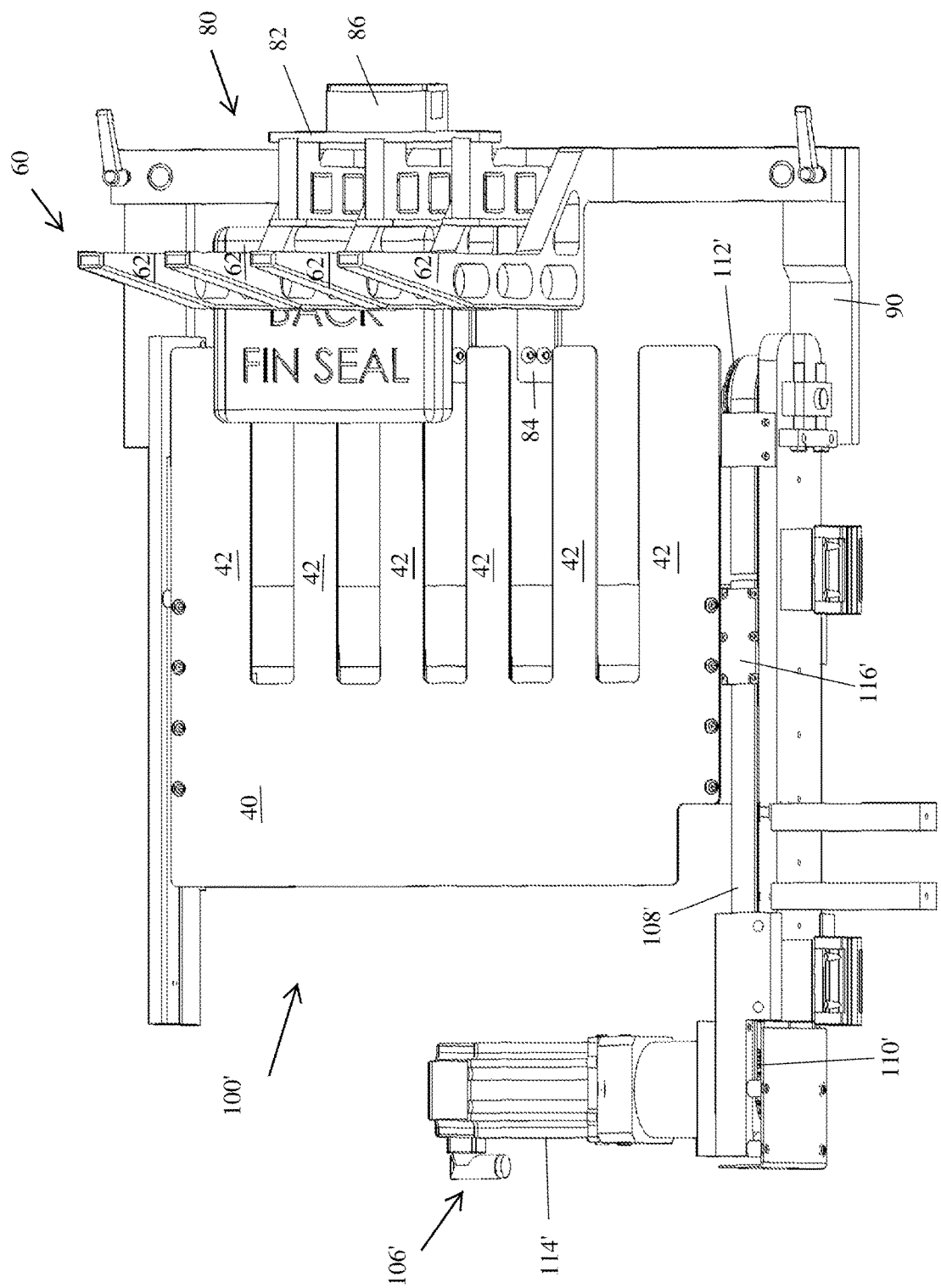

ARTICLE ACCUMULATION AND ARTICLE GROUP FORMATION

This is a United States utility patent application filed under 35 USC § 111(a) claiming priority under 35 USC § 120 of/to U.S. Pat. Appl. Ser. No. 62/752,591 filed Oct. 30, 2018 and entitled ARTICLE ACCUMULATION AND ACCUMULATED ARTICLE TRANSFER/TRANSFER CASE LOAD FOR FLAT PACK OPERATIONS, incorporated by reference herein/by in its entirety.

TECHNICAL FIELD

The present invention is generally directed to automated packaging machines and operations associated therewith, more particularly, to any one or all of the accumulation of articles (i.e., product) in a flat/laydown orientation, formation of an article group from the accumulating articles, and discharge of a formed article group to a tray, case, carton, etc., the instant disclosure directed to a work station characterized by attendant systems, devices, apparatus, assemblies or subassemblies, as may be the case, to effectuate one or more of the stated operations.

BACKGROUND

Case and/or tray packing operations are well known and varied. Commonly, articles, often times packaged goods, are collected to form a group, with the formed group loaded into a case or otherwise bundled. As is well known and appreciated in the art, article groups may be horizontally or vertically oriented in relation to their case, either in a flat or a stand up condition. In each article group load scenario, either or both of article accumulation and accumulated article transfer/transfer case loading can be at least challenging, if not problematic.

In relation to flat packing, it is generally known to use a robotic arm, e.g., a Delta 3 (D3) type of robot, to pick-and-place individual articles into a pattern either directly into a case, or to create a select article pattern or grouping on some sort of device/deck, then thereafter transfer the entire patterned article group into a case as part of a case loading operation. Commonly, a pick head of a D3 robot operating between first and second conveyors collects inflow articles from the first article conveyor and places collected articles on the second conveyor. It is likewise known to use a powered device to push, stack, pull, or rotate product into a pattern.

A further known flat pack approach utilizes an accumulation load plate, such feature being part-and-parcel of a Trivex® SL top load packer from Applicant Douglas Machine, Inc. Minnesota, USA. Advantageously, the Trivex packer provides a dual Selective Compliance Assembly Robot Arms or Selective Compliance Articulated Robot Arms (SCARA) robotic solution, uniquely combining the functionality of a product infeed, pack pattern collation, and case loading functions into one operably unit or station. Particulars for a flat pack top load approach are memorialized in WIPO publication WO 2017/147584, Applicant's international patent application entitled ARTICLE ACCUMULATION PATTERN BUILDING LOAD PLATE, With particulars for an advantageous vertical pack top load approach memorialized in WIPO publication WO 2017/041007, Applicant's international patent application entitled IMPROVED ROBOTIC HANDLING SYSTEM & OPERATIONS, each publication hereby incorporated by reference in its entirety. An alternate, further noteworthy background teaching is Applicant's U.S. Patent Appl. Pub, No. US 2017/0101200 directed to intermittent top load case packing operations, both laydown and stand up orientations, said publication likewise hereby incorporated by reference in its entirety.

With reference to FIG. 6 of the '584 international publication, product such as pouches, bags, cartons, etc. are delivered by a conveyor or other device to transfer products to the product dividing device as an initial flat pack processing step. The products are then transferred via a side-to-side shifting by either a side shifting conveyor (i.e., a/k/a a product placement conveyor, see e.g., U.S. Pat. No. 8,356,456) or other device known or capable of dividing product into more than one column (i.e., positioning of articles across the machine, namely, positioning articles at first and second z depths in a direction transverse to process flow). Products may also remain in a single column, thus needing no dividing/divider.

The product is next transferred to an accumulation plate. The plate may be angled, flat or curved in shape, and/or adjustable from 0-90 degrees, and may be advantageously formed/fabricated from a ridged, flexible, fabric, electric actuated polymer (EAP), static material, or contrariwise, the plate may effectively comprise some sort of powered (conveyor) deck. The plate allows product to slide or be moved down to a stop which delimits a downstream most extent of the structure. The stop may be made out of different materials and may be made fixed or powered.

A divider, advantageously used to separate product layers from each other, may be fixed or powered, and is not limited to a single divider per plate, with multiples contemplated. The divider aids in shingling (i.e., overlapping) product to create a tighter article or product pattern. Arrived product is elevated by the divider so arriving product can be shingled underneath. This shingling can happen in either direction. The divider may run horizontally across the plate as shown or vertically to obtain shingling of product in multiple directions or just one direction at a time. Side plates may or may not be provided to shape and/or compress product horizontally to obtain a tighter pattern of products, or to shingle the products. Products (i.e., the patterned product group) thereafter may be picked off the plate with a vacuum or other mechanical means. The product group may also be slid further down the plate to either assist with loading directly into the case or into another staging area (product containment/load ramp).

While increased processing speeds have been realized, it has arguably been at the cost of precision/repeatability—when things go wrong, they go very wrong. Mispicked or misplaced articles straight off or during loading, not to mention articles not captured by the picker, result in processing stoppages. With an increased variety of packing for prepackage goods, reliable picking has become an increasing challenge, and, maintenance of the integrity of the article pack pattern (i.e., the pattern/pack remains suitably intact/aligned (e.g., in an x-y-z space) similarly so. It is believed advantageous to provide a non-vacuum/suction picker for pack pattern formation (and pack transfer and/or loading), and further believed advantageous and desirable to establish and maintain a guided article pack during a majority of all, if not all, processing related steps, namely, article accumulation, article group formation, and article group discharge/transfer in furtherance of case loading or the like. Further still, processing speed and work station space constraints remain ongoing concerns for processors, with work station modularity/adaptability remaining desirable and advantageous.

SUMMARY OF THE INVENTION

An article processing station is generally provided. More particularly, an article processing station wherein article groups are formed and article groups are discharged is provided.

The article processing station generally and primarily includes an accumulating article passage or shaft, having ingress and egress portions, and a robotic end of arm tool (EOAT). The EOAT is actuatable such that an operable portion thereof travels to, through and from the accumulating article passage, the operable EOAT portion receiving articles entering the ingress portion of the accumulating article passage while traveling from the ingress portion towards the egress portion of the accumulating article passage.

The accumulating article passage includes a grouped article receiving deck delimiting a passage floor within the egress portion of the station, opposingly paired sidewalls extending in a process flow direction, and an end wall extending in a direction transverse to process flow and downstream of the opposingly paired sidewalls. The grouped article receiving deck includes spaced apart deck fingers extending in a process flow direction, with the end wall including spaced apart upstanding wall fingers. Notionally, the operable portion of the EOAT deposits or transfers a formed article group upon the grouped article receiving deck upon travel from the accumulating article shaft.

The EOAT is generally characterized by a body and spaced apart tool fingers extending therefrom, the tool fingers operably extend in an upstream. posture. When suitably animated by the robot (e.g., and without limitation, a SCARA three axis robot), the EOAT travels toward the accumulating article passage, the tool fingers entering the ingress portion thereof for receipt of incoming articles. The tool fingers may enter the accumulating article passage by travelling over or through the downstream end wall, the tool fingers passing through spaces of the spaced apart upstanding wall fingers. As the EOAT travels from the ingress portion to the egress portion of the accumulating article passage, article accumulation (i.e., stacking of 2D article arrays) is effectuated. With a select article pack pattern/article group formed/established, such article group is received upon the grouped article receiving deck for subsequent discharge as the tool fingers travel down and in a process flow direction through spaces of both the spaced apart deck fingers and spaced apart end wall fingers thereby transferring the formed article group to the receiving deck.

As to the sidewalls, a portion of at least one sidewall is adapted for actuatable translation across the process flow direction to effectuate a shaping of an article group. More particularly, in the context of sidewalls characterized by ingress and egress sidewall portions, at least one egress sidewall portion is so adapted. More particularly still, the ingress sidewall portions are advantageously configured as article ingress guides, with the egress sidewall portions advantageously configured as tamper plates, namely, actuatable tamper plates that may be drawn towards each other to compress or otherwise condition the article group in advance of discharge. Provisions for a translation assembly to animate the tamper plates is contemplated and provided for.

With regard to the grouped article receiving deck, it is advantageously adapted for actuatable translation in an upstream direction in furtherance of depositing a formed article group to an underlying carton, case, tray, etc., positionable thereunder. Provisions for a translation assembly to animate the grouped article receiving deck is likewise contemplated and provided for.

Advantageously, the accumulating article passage unit is of modular design in furtherance of service, change out, substitution, etc. with several parts/subassemblies of the article processing station being change parts to support processing of numerous and varied articles. More specific features and advantages obtained in view of the summarized features will become apparent with reference to the drawing figures and DETAILED DESCRIPTION OF THE INVENTION.

A preferred method of forming article groups from inflowing articles at a work station is likewise contemplated and provided. More particularly, and without limitation, provisions are generally made for an accumulating article passage and a robotic EOAT.

The accumulating article passage has an ingress portion and an egress portion, the passage characterized by passage walls spanning the ingress and egress portions of the accumulating article passage, a passage wall of the passage walls being an end wall extending in a direction transverse to process flow. The robotic EOAT, subject to animation by a robot for travel to and from the accumulating article passage, includes an operable portion for receipt of articles entering the ingress portion of the accumulating article passage.

The operable portion of the EOAT is inserted into the ingress portion of the accumulating article passage, for example via passage through the end wall thereof, for receipt of a first article entering the ingress portion of the accumulating article passage. The EOAT is thereafter animated such that the operable portion thereof further receives articles sequentially entering the ingress portion of the accumulating article passage as the operable portion of the EOAT travels within the accumulating article passage from the ingress portion toward the egress portion thereof in furtherance of forming an article group. Advantageously, the formed article group is transferred from the EOAT to a deck within the egress portion of the accumulating article passage as the operable portion of the EOAT passes through the deck and from the egress portion of said accumulating article passage.

BRIEF DESCRIPTION OF THE DRAWINGS

FIGS. 1-5 are provided herewith wherein:

FIG. 1 depicts, end perspective view, a representative, non-limiting article processing station wherein article groups are formed and article groups discharged;

FIG. 2 depicts the article processing station of FIG. 1, assemblies, subassemblies and/or elements omitted to better illustrate particulars thereof;

FIG. 3 depicts, end elevation, the article processing station elements of FIG. 2;

FIG. 4 depicts the article processing station elements of FIG. 2, assemblies, subassemblies and/or elements further omitted to better illustrate particulars thereof; and, FIG. 5 depicts, slight perspective plan view, the article processing station elements of FIG. 4.

DETAILED DESCRIPTION OF THE INVENTION

A preferred, non-limiting article processing station is hereinafter described and shown, with attendant methods correspondingly set forth. More particularly, preferred, non-limiting station assemblies, subassemblies, structures and/or mechanisms relating to and for improved/simplified article group formation are generally disclosed and presented throughout the figures of the subject disclosure.

Figure 1:
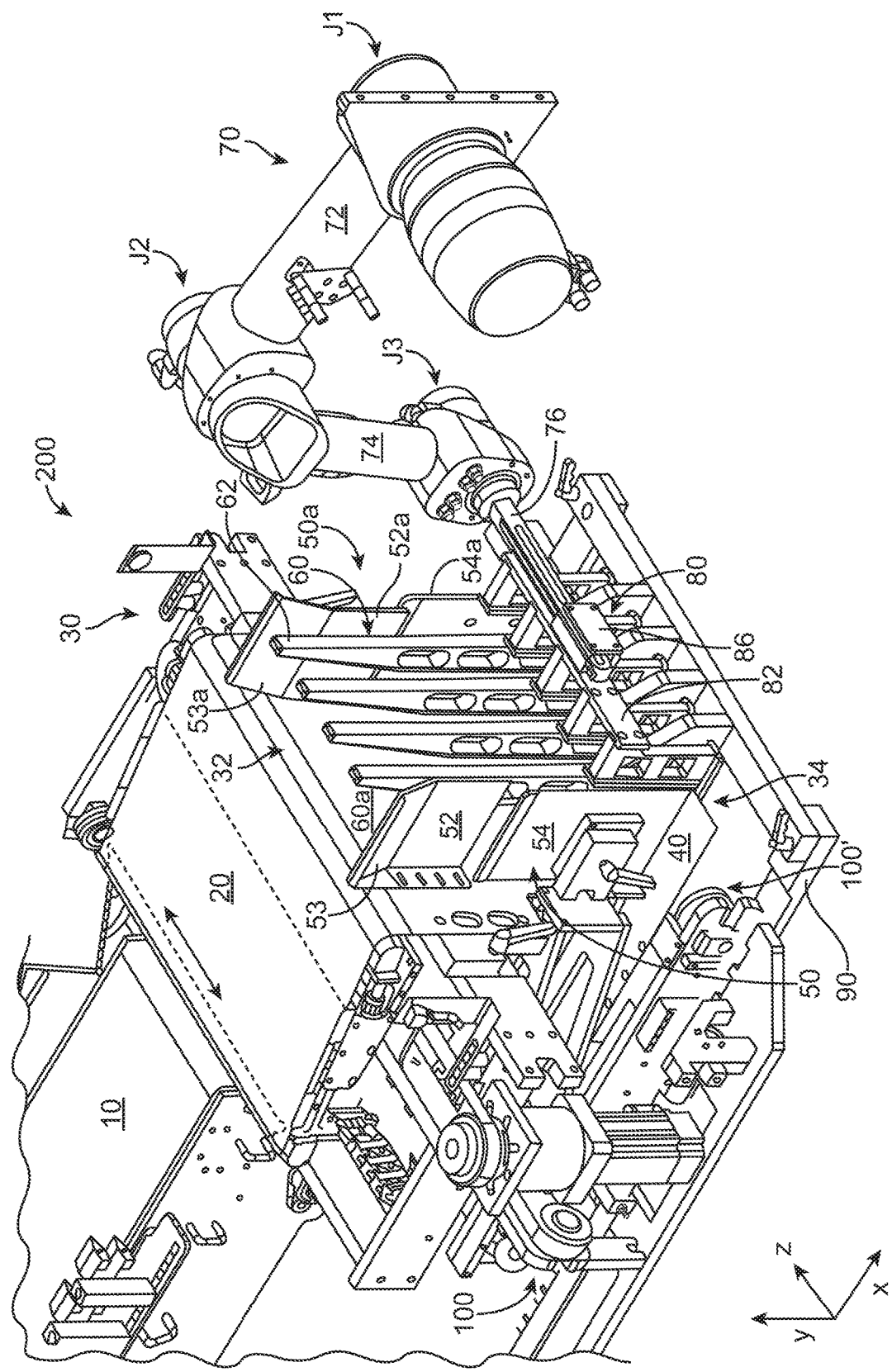
Figure 2:
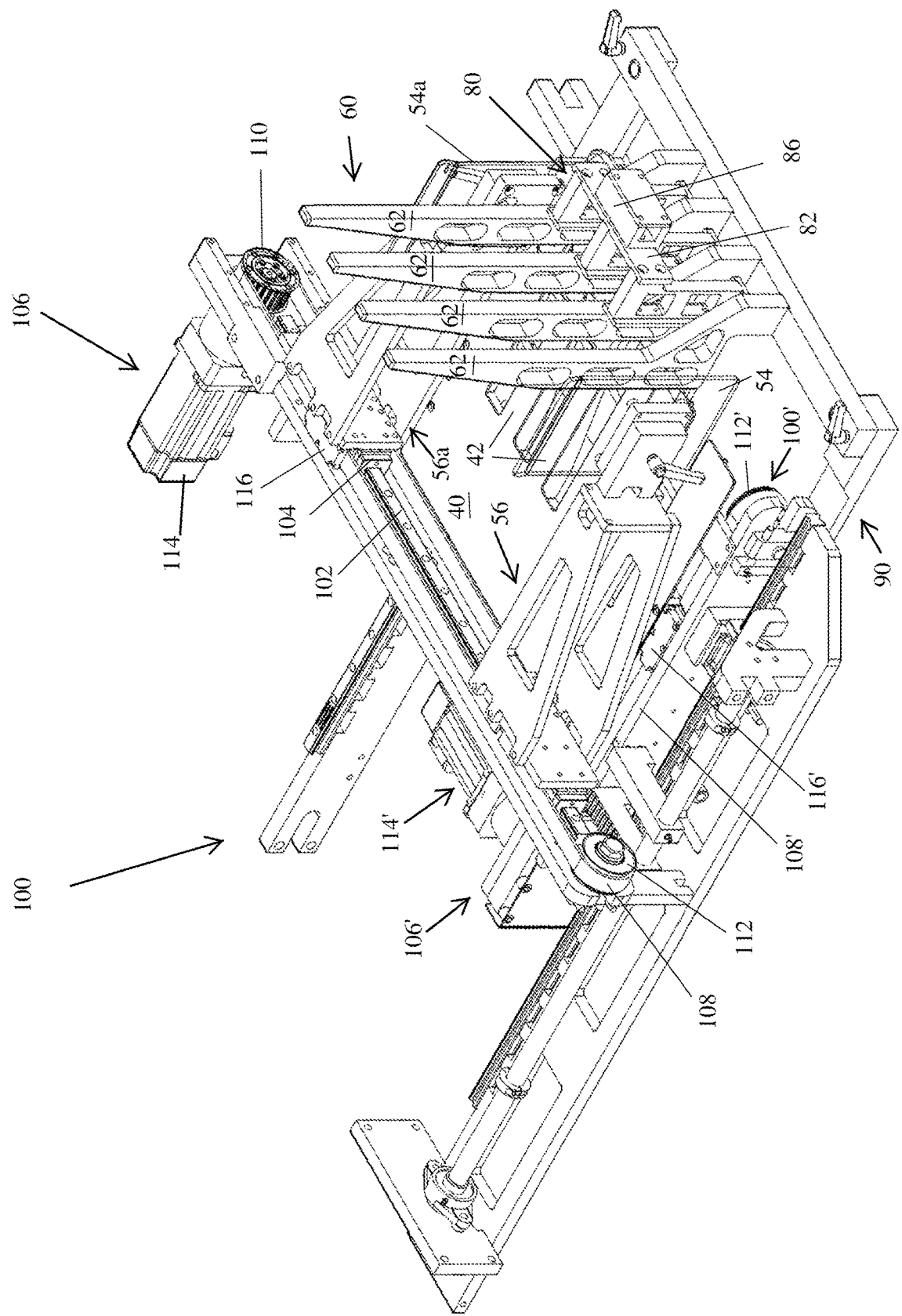
Figure 3:
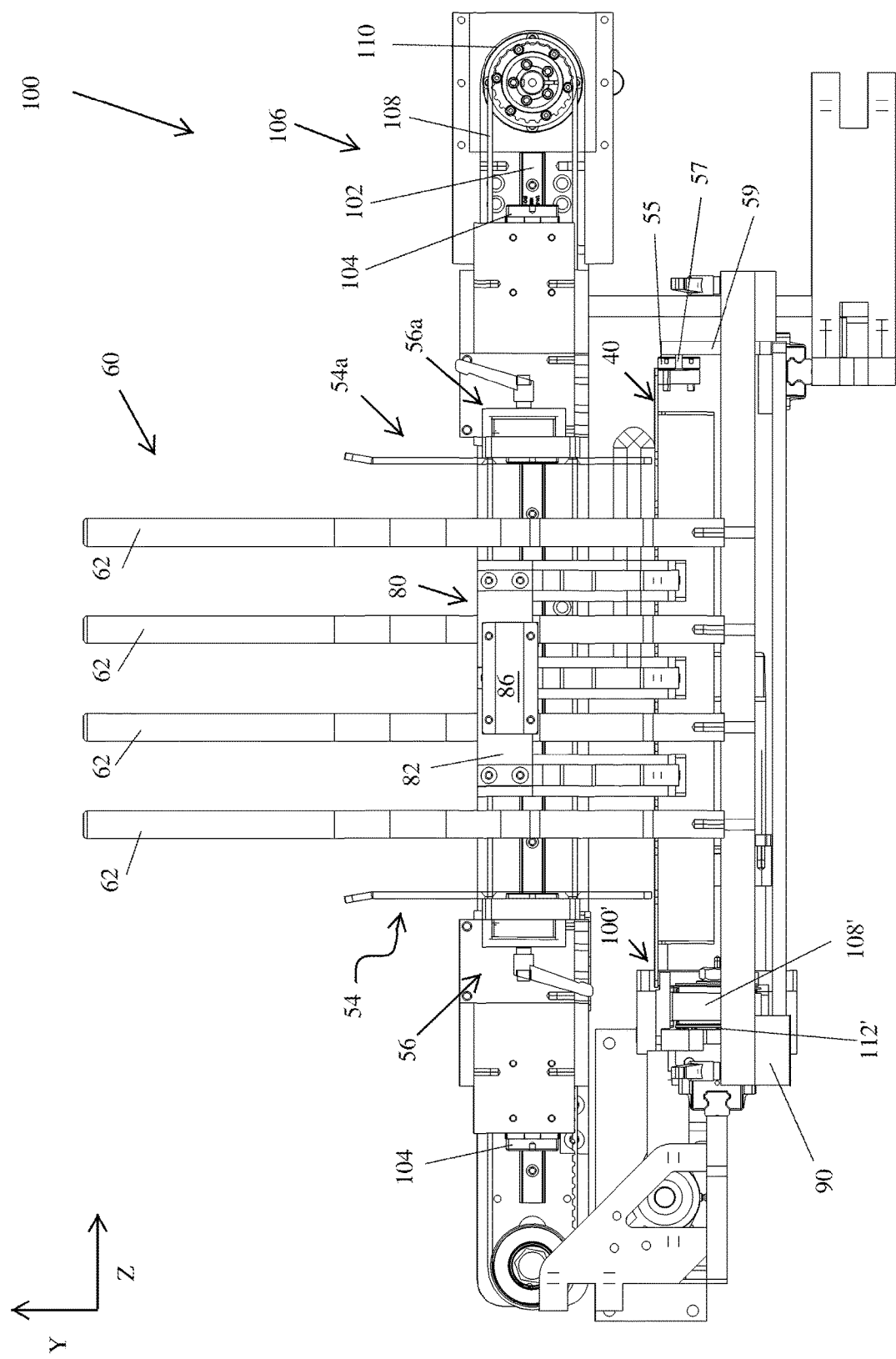

An advantageous, non-limiting article processing station is shown FIG. 1, see FIGS. 1-3 of Applicant's earlier cited '007 international publication and/or FIG. 1, FIG. 7 et seq. of Applicant's earlier cited '584 international publication for exemplary, non-limiting context. The station of FIG. 1 is depicted in the alternate views of FIGS. 2 & 3, parts removed, with that structure further depicted in the alternate views of FIGS. 4 & 5, additional parts removed. It is to be noted that the article processing station is advantageously, but not necessarily characterized by a variety of change parts, with the station preferably adapted such that at least a substantial portion thereof is readily removable or at least selectively positionable relative to up and/or downstream processing systems, assemblies and/or components as the case may be in furtherance of maintenance operations and/or substitution as processing operations warrant.

With reference to FIG. 1, there is generally shown an advantageous, non-limiting article processing station 200. Functionally, the station aims, preferably but not necessarily, to collate, aggregate or otherwise accumulate articles (i.e., "product"), form an article group from the accumulating and/or accumulated articles, and discharge the formed article group for cartoning or the like. Notionally, and without limitation, articles/products are conveyed by a conveyor, e.g., an infeed conveyor 10, to a product dividing device, e.g., a product placement conveyor 20, divided product thereafter passing to article processing station 200, the station generally characterized by an accumulating article shaft or passage (vertical) 30 and a robotic end of arm tool (EOAT) 80 of robot 70, the divided product received by a portion of the EOAT positioned therein, more particularly, divided product sequentially received thereby in furtherance of forming an article group (i.e., layering of ingress articles so as to form layered article arrays—product packs).

Via conveyor 10 or the like, articles such as pouches, bags, cartons, etc. are transported for manipulations in furtherance of what is essentially article pack building. Commonly, articles flow single file upon such conveyor, i.e., articles are spaced apart in a process flow, "x" direction so as to present in a single column, i.e., single "z" depth. Product is commonly divided so as to commence formation of an article array, i.e., an x-z article matrix with z>1, what essentially becomes a product "layer," a 2D component of a 3D article array (i.e., group).

Advantageously, but not necessarily, product placement conveyor 20, a side shifting (i.e., z-oscillating) conveyor, or other product lane dividing device, creates at least two lanes of product from a single infeed article stream, i.e., in furtherance of creating a 1×2 article matrix, articles are alternately received upon deck of oscillating conveyor 20 at two distinct deck depth (z) locations, the articles thus exiting the deck/conveyor at two distinct deck depth (z) locations and thereby delimiting, in this scenario, two article columns for accumulating article shaft ingress (again, see Applicant's U.S. Pat. No. 8,356,456, incorporated herein by reference in its entirety, for particulars as to such device). Contemplated article pack layer arrays include, but are not limited to 1×1, 1×2, 1×3, 2×2, 2×3.

With continued reference to FIG. 1, accumulating article shaft 30 is generally adjacent the egress portion of the article conveyor, more particularly as shown, product placement conveyor 20. Notionally, accumulating article shaft 30 is characterized by an ingress portion 32 and an egress portion 34; articles sequentially enter at the ingress portion and an article group exits at the egress portion thereof. Advantageously, but not necessarily, the accumulating article shaft is contextually provided as a modular unit in a robust article processing system; via adaptations, such as the inclusion of translatable carriage/framing and a translation assembly, characterized by, among other things, a pair of spaced apart tracks operably, united therewith, the accumulating article shaft unit may be readily relocated for maintenance and/or removed/replaced.

Accumulating article shaft 30 generally but not necessarily includes, as shown, a grouped article receiving deck 40, opposingly paired side walls 50, 50a, and opposing end walls 60, 60a. Grouped article receiving deck 40 delimits a shaft floor within egress portion 34 of accumulating article shaft 30. Opposingly paired sidewalls 50, 50a extend in a process flow direction (x-direction), and span ingress 32 and egress 34 portions of accumulating article shaft 30. Opposing end walls, downstream 60 and upstream 60a end walls in relation to the opposingly paired sidewalls 50, 50a, extend in a direction transverse to process flow (z-direction) and likewise span ingress 32 and egress 34 portions of accumulating article shaft 30.

Figure 4:
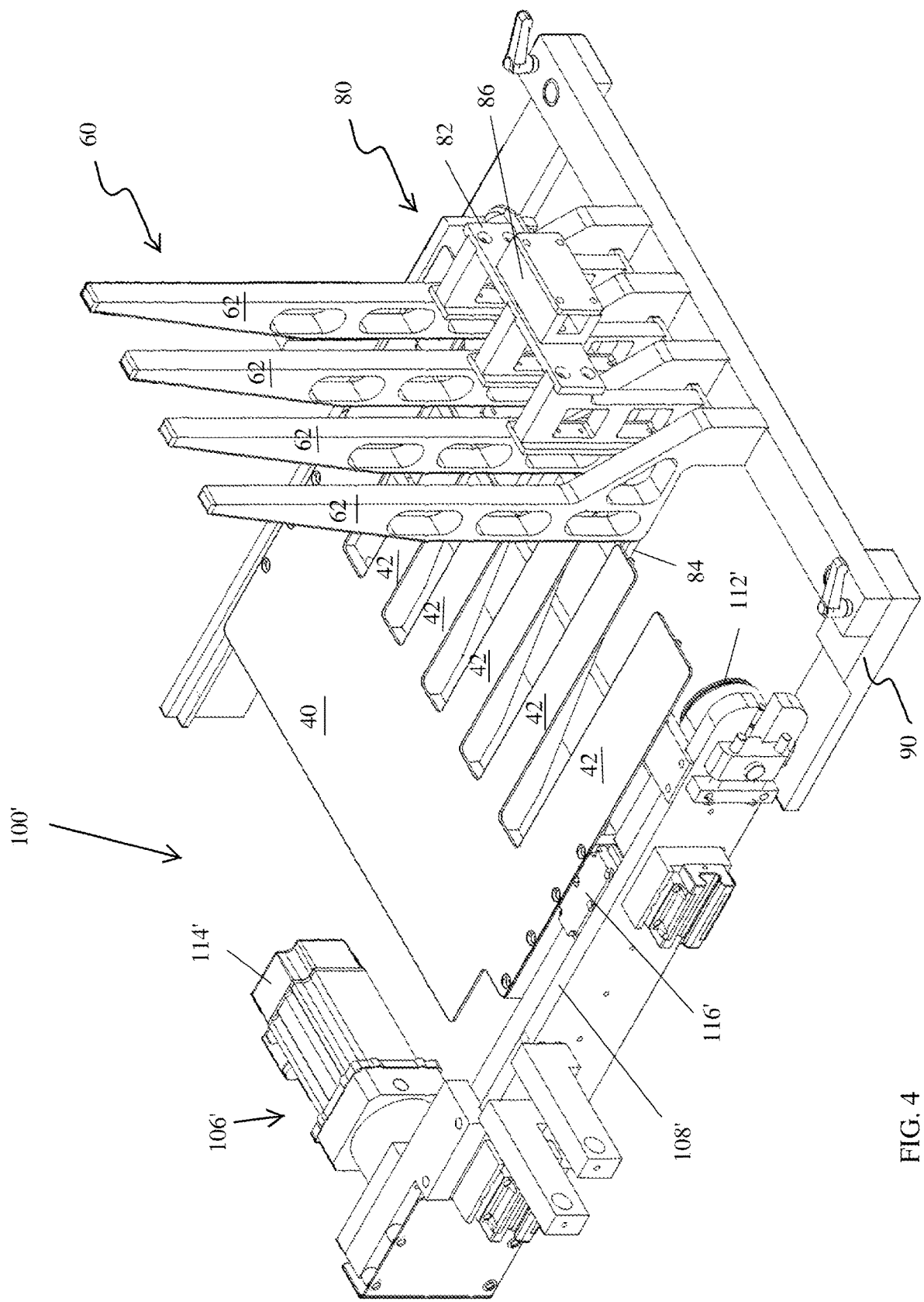

As to the end walls 60, 60a, downstream end wall 60, advantageously provided in the form of an assembly change part, is characterized by spaced apart wall fingers, more particularly, spaced apart upstanding wall fingers 62 as shown (see also and especially FIGS. 3 & 4). As will be appreciated as this description proceeds, the configuration of the downstream end wall permits passage of a portion of the EOAT such that it may be operatively passed into and from the accumulating article shaft, relative to the ingress and egress portions of the accumulating article passage respectively, and to be operatively positionable within same in furtherance of establishing article pack layer arrays (i.e., 3D article arrays (x-z-y) from incoming articles which form 2D article arrays (x-z) in the egress portion of the accumulating article passage). Upstream end wall 60a, generally provided in the form of a panel as shown, is advantageously but not necessarily provided in furtherance of a "containering" function for the accumulation process (i.e., enables/establishes/delimits a "sleeve" configuration for the accumulating article shaft versus a "channel" configuration for same). Moreover, as shown, the upstream end wall functions as a structural element for supporting a portion of each of the sidewalls as will subsequently taken up.

As to sidewalls 50, 50a, advantageously, but not necessarily, the sidewalls structurally mimic each other. The sidewalls may be fairly characterized as having an ingress sidewall portion and an egress sidewall portion, more particularly as shown, an ingress sidewall portion comprised of an article entry guide 52, and an egress sidewall portion comprised of a tamper plate 54, the tamper plate advantageously provided in the form of an assembly change part.

In addition to fore-and-aft (x-direction) article/accumulating article/grouped article constraint via end walls 60, 60a, the sidewalls provided side-to-side (z-direction) article/accumulating article/grouped article control/constraint. Article entry guides 52, 52a each include an angular surface 53, 53a the angular entry guide surfaces delimiting a funnel-like ingress/mouth for the ingress portion of the accumulating article shaft to facilitate article entry/collection there at. Tamper plates 54, 54a are intended to tamp the sides of a formed article group, with at least one plate of the paired plates being translatable so as to engage, e.g., compress and shape/shape the pattered article pack against the other plate, or squeeze the article pack between each actuatable tamper plate.

With particular reference to FIGS. 2 & 3, and continued general reference to FIG. 1, each of the illustrated tamper plates are supported by bracket or arm assemblies 56 which are actuatable for travel in a cross machine z-direction via a translation assembly 100. The translation assembly generally includes a track 102, a track follower in the form of a carriage 104 as shown, and a drive assembly 106, the drive assembly advantageously but not necessarily characterized by an endless belt 108, a drive pulley 110, a driven pulley 112 and driver (e.g., servo motor 114 as shown). Bracket assemblies 56 are united to belt 108 for movement therewith via an operative combination of carriage 104, affixed to a portion of bracket assembly 56, and a belt anchor 116, carried by belt 108. As should be readily appreciated, alternate mechanisms to effectuate the sought after motion, and thus function of the tamper plate, is considered conventional. Moreover, while it is believed desirable and advantageous to have the tamper plates be drawn together generally, and specifically by a common as opposed to discrete assemblies, suitable article group shaping may be effectuated via actuation of one tamper plate, i.e., actuation of a first actuatable tamper plate relative to a second static tamper plate.

With particular reference to FIGS. 4 & 5, and continued general reference to FIG. 1, grouped article receiving deck 40, advantageously provided in the form of an assembly change part, is characterized by spaced apart deck fingers 42, the deck fingers "pointing" in a process flow direction (i.e., downstream). As best appreciated with reference to FIG. 5, and in relation to the downstream end wall, there exists a general alignment of the fingers and the spaces therebetween for each of deck 40 and downstream end wall 60, the operable portion of the EOAT travelable within the finger spaces of those chamber elements. Again, notionally, the deck is positioned in a travel path of a portion of the EOAT so as to "intercept" the articles thereon; articles accumulating on the EOAT portion within the accumulating article chamber during decent of the EOAT (i.e., the operative portion of the EOAT traveling from the chamber ingress to the chamber egress) are ultimately transferred thereto.

The grouped article receiving deck 40 advantageously comprises an actuatable article receiving deck. The deck, performing among other things a keeper function, is an actuatable floor for the accumulating article shaft. The deck is supported and operably combined with a translation assembly 100', advantageously but not necessarily in keeping with translation assembly 100 of tamper plates 54, 54a, so as to selectively retract in an anti-process flow direction (i.e., upstream direction).

As is best appreciated with reference to FIG. 3, a "left" side of the deck is operatively supported for driven retraction, the "right" side being passively supported relative to framing via paired rollers 55 or the like about a flange 57 of a support member 59 of unit framing 90. Deck 40 is united to belt 108' of translation assembly 100' for movement therewith via an operative combination of carriage (not visible), affixed to a portion of deck 40 via a bracket 118, and belt anchor 116', carried by belt 108'. Notionally, upon satisfactory article group shaping, cooperating elements supporting or at least underlying an article group (i.e., the deck and operative EOAT portion) are drawn away in opposition (i.e., the deck upstream; the EOAT downstream) so as to discharge or pass the article group into an underlying container/receptacle.

With renewed reference to FIG. 1, and as appreciate in respect to the description to this point, the contemplated article processing station is characterized by robotic operations. While a single robot is shown for the sake of illustrative clarity, two sequentially operating units are advantageous and desirable, more particularly, and as shown, SCARAB are used to animate EOATs carried thereby in furtherance of receiving incoming articles at the ingress portion of the accumulating article shaft, more particularly, sequentially receiving incoming articles in furtherance of forming a layered article pack array.

In keeping with Applicant's prior teaching, namely, the '007 international publication, each SCARA includes first (upper) 72 and second (lower) 74 arm segments, and three arm joints J1, J2, & J3. A first arm joint (J1) is a terminal/anchorable arm joint (i.e., the robotic arm depends from J1). A second arm joint (J2) is an intermediate arm joint. A third arm joint (J3) is a distal or free-end arm joint which operatively supports the EOAT. Absent adaptation, the SCARAB operate in a single plane, i.e., two dimensions, with two or three axis functionality, the contemplated SCARAB possessing three axis functionality.

As to the EOAT, and with further particular reference to FIG. 5, it is characterized by spaced apart tool fingers 84, the tool fingers operably "pointing" in an anti-process flow direction (i.e., upstream). Tool fingers 84, essentially the operative portion of the EOAT, extend from a tool body 82, tool body 82 including a connector, a channel 86 or like as shown, for receipt of a shaft 76 operatively extending from joint J3 of SCARA 70. Tool fingers 62 are receivable in the spaces of spaced apart wall fingers 62, and the spaces of spaced apart deck fingers 42.

While tool body 82 is generally depicted downstream of downstream end wall 60, a full/advantageous upstream posture for the EOAT has the tool body substantially flush, in the process flow direction, with the downstream end wall such that the tool fingers substantially traverse the accumulating article shaft in the process flow direction, x-dimension. Moreover, while a relatively horizontal extension for the tool fingers is indicated/inferred in relation to the accumulating article shaft, it need not be so limited. Recalling a pivotable support for the EOAT at J3 of the SCARA, the EOAT, and thus the tool fingers, may be suitable angled, e.g., via a clockwise rotation (FIG. 1) such that an upper EOAT body portion is further downstream than a lower EOAT body portion.

Having presented particulars for the contemplated article processing station, a general overview of station operations concludes this description. Operations fairly commence with EOAT 80 positioned by SCARA 70 such that tool fingers 84, the operative EOAT portion thereof, reside within ingress portion 32 of accumulating article passage 30, at an elevation below the egress point of article infeed apparatus 20 as shown. In the context of two article column processing, first and second articles are received upon tool fingers 84 of EOAT 80 with SCARA 70 thereafter lowering EOAT 80 to created vertical (y-dimension) space for a second set of inflowing articles, e.g., third and fourth articles. As the accumulating articles descend from ingress 32 to egress 34 portion of accumulating article passage 30 upon EOAT 80, they are collectively confined and retained by the structures of the accumulating article passage, namely, side 50, 50a and end walls 60, 60a thereof. Upon formation of a sought after pattern pack, i.e., achieved select layering, tool fingers 84 commence entry into the spaces of spaced apart deck fingers 42. Thereafter, tamping operations are conducted via actuation of tamper plates 54, 54a to delimit a ready-to-discharge article group, with both grouped article receiving deck 40 and EOAT 80 animated to permit discharge from egress portion 34 of accumulating article passage 30; deck 40 retracting in an upstream direction with EOAT 80 traveling downstream in furtherance of commencement to a further article processing cycle.

What has been described and depicted herein are preferred, non-limiting embodiments of Applicant's subject matter, along with one or more application contexts. Since the structures of the station, assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal processing has be described and detailed, and to some degree alternate work pieces and systems, assemblies, etc. with regard thereto referenced, contemplated system and/or processes are not so limited. Accordingly, the scope of the subject invention is as defined in the language of the appended claims, and includes not insubstantial equivalents thereto.

That which is claimed:

1. An article processing station wherein article groups are formed and article groups discharged, the article processing station comprising:
   a. an accumulating article shaft having an ingress portion and an egress portion, said accumulating article shaft comprising a grouped article receiving deck delimiting a shaft floor within said egress portion of said accumulating article shaft, opposingly paired sidewalls extending in a process flow direction and spanning said ingress and egress portions of said accumulating article shaft, and an end wall extending in a direction transverse to process flow and downstream of said opposingly paired sidewalls and spanning said ingress and egress portions of said accumulating article shaft, said grouped article receiving deck comprising spaced apart deck fingers extending in a process flow direction, said end wall comprising spaced apart wall fingers; and,
   b. a robotic end of arm tool comprising spaced apart tool fingers, said spaced apart tool fingers registerable in relation to spaces of said spaced apart end wall fingers and spaces of said spaced apart deck fingers so as to thereby pass through said end wall and said grouped article deck respectively, said robotic end of arm tool animated for travel to, through and from said accumulating article shaft, said robotic end of arm tool receiving articles entering said ingress portion of said accumulating article shaft while traveling from said ingress portion towards said egress portion in furtherance of depositing an article group upon said grouped article receiving deck during travel from said accumulating article shaft.

2. The article processing station of claim 1 wherein a portion of a sidewall of said opposingly paired sidewalls of said accumulating article shaft is actuatable for translation in a direction transverse to process flow in furtherance of shaping an article group received by said grouped article receiving deck.

3. The article processing station of claim 1 wherein a portion of a sidewall of each sidewall of said opposingly paired sidewalls of said accumulating article shaft is actuatable for translation in a direction transverse to process flow in furtherance of shaping an article group received by said grouped article receiving deck.

4. The article processing station of claim 1 wherein each of said opposingly paired sidewalls of said accumulating article shaft comprise an ingress sidewall portion and an egress sidewall portion.

5. The article processing station of claim 1 wherein each of said opposingly paired sidewalls of said accumulating article shaft includes an article ingress guide portion.

6. The article processing station of claim 1 wherein each of said opposingly paired sidewalls of said accumulating article shaft includes an article group tamper plate.

7. The article processing station of claim 1 wherein each of said opposingly paired sidewalls of said accumulating article shaft includes an article group tamper plate, one article group tamper plate being actuatable to engage and tamp the article group.

8. The article processing station of claim 1 wherein each of said opposingly paired sidewalls of said accumulating article shaft includes an article group tamper plate, each article group tamper plate being actuatable to engage and tamp/shape the article group therebetween.

9. The article processing station of claim 1 wherein each of said opposingly paired sidewalls of said accumulating article shaft includes an article group tamper plate, said article group tamper plate being a change part.

10. The article processing station of claim 1 wherein said grouped article receiving deck of said accumulating article shaft is a change part.

11. The article processing station of claim 1 wherein said end wall of said accumulating article shaft is a change part.

12. The article processing station of claim 1 wherein each of said grouped article receiving deck and said end wall of said accumulating article shaft is a change part.

13. The article processing station of claim 1 wherein said grouped article receiving deck is an actuatable grouped article receiving deck.

14. The article processing station of claim 1 wherein said grouped article receiving deck is adapted for actuation in furtherance of passing the article group to a case positionable thereunder.

15. The article processing station of claim 1 wherein said grouped article receiving deck is retractable in a direction opposite to a process flow direction in furtherance of permitting egress of the article group from said egress portion of said accumulating article shaft.

16. The article processing station of claim 1 wherein said robotic end of arm tool is advanceable toward said accumulating article shaft from a downstream locus.

17. The article processing station of claim 1 wherein said robotic end of arm tool is advanceable toward said accumulating article shaft from a downstream locus, said spaced apart tool fingers thereof advanceable into said accumulating article shaft for select receipt of article entering said ingress portion thereof.

18. The article processing station of claim 1 wherein said robotic end of arm tool is retractable from said accumulating article shaft, said spaced apart tool fingers thereof retractable from said accumulating article shaft in furtherance of transferring an article group to said grouped article receiving deck.

19. The article processing station of claim 1 wherein said spaced apart tool fingers of said robotic end of arm tool are retractable from said accumulating article shaft in furtherance of transferring an article group to said grouped article receiving deck, said grouped article receiving deck retracted in relation to said end wall of said accumulating article shaft in furtherance of permitting passage of an article group from said egress portion of said accumulating article shaft.

20. The article processing station of claim 1 further comprising a robot, said robotic end of arm tool carried by said robot.

21. The article processing station of claim 1 further comprising a three axis robot, said robotic end of arm tool carried by said three axis robot.

22. The article processing station of claim 1 further comprising a SCARA robot, said robotic end of arm tool carried by said SCARA robot.

23. The article processing station of claim 1 further comprising an article infeed apparatus for delivering articles to said accumulating article shaft.

24. The article processing station of claim 1 further comprising an article infeed apparatus for delivering columned articles to said accumulating article shaft, said article infeed apparatus.

25. An article processing station wherein article groups are formed and article groups discharged, the article processing station comprising:
 a. an accumulating article passage having an ingress portion and an egress portion, said accumulating article passage comprising a grouped article receiving deck delimiting a passage floor within said egress portion, opposingly paired sidewalls extending in a process flow direction, and an end wall extending in a direction transverse to process flow and downstream of said opposingly paired sidewalls, said grouped article receiving deck comprising spaced apart deck fingers extending in a process flow direction, said end wall comprising spaced apart upstanding wall fingers; and,
 b. a robotic end of arm tool for travel to and from said accumulating article passage, a portion of said robotic end of arm tool passable through said accumulating article passage for receipt of articles entering said ingress portion of said accumulating article passage while traveling from said ingress portion towards said egress portion in furtherance of depositing an article group upon said grouped article receiving deck upon travel from said accumulating article shaft.

26. A method of forming article groups from inflowing articles at an article processing station, the method comprising:
 a. providing an accumulating article passage having an ingress portion and an egress portion, said accumulating article passage comprising passage walls spanning said ingress portion and said egress portion of said accumulating article passage, a passage wall of said passage walls being an end wall extending in a direction transverse to process flow;
 b. providing a robotic end of arm tool subject to animation by a robot for travel to and from said accumulating article passage, said robotic end of arm tool having an operable portion for receipt of articles entering said ingress portion of said accumulating article passage;
 c. inserting said operable portion of said robotic end of arm tool into said ingress portion of said accumulating article passage for receipt of a first article entering said ingress portion of said accumulating article passage; and,
 d. animating said robotic end of arm tool such that said operable portion thereof further receives articles sequentially entering said ingress portion of said accumulating article passage as said operable portion of said robotic end of arm tool travels within said accumulating article passage from said ingress portion toward said egress portion thereof in furtherance of forming an article group.

27. The method of claim 26 wherein said inserting said operable portion of said robotic end of arm tool into said ingress portion of said accumulating article passage is via passing same through said end wall of said accumulating article passage.

28. The method of claim 26 further comprising transferring a formed article group from said operable portion of said robotic end of arm tool to a deck within said egress portion of said accumulating article passage as said operable portion of said robotic end of arm tool passes through said deck and from said egress portion of said accumulating article passage.

29. The method of claim 26 wherein said inserting said operable portion of said robotic end of arm tool into said ingress portion of said accumulating article passage is via passing same through said end wall of said accumulating article passage, said method further comprising transferring a formed article group from said operable portion of said robotic end of arm tool to a deck with said egress portion of said accumulating article passage as said operable portion of said robotic end of arm tool passes through said deck and from said egress portion of said accumulating article passage.

* * * * *